2,748,118
N-ALKYL-QUINOXALINIUM SALTS

Jean Druey, Riehen, and Albrecht Hueni, Basel, Switzerland, assignors to Ciba Pharmaceutical Products, Inc., Summit, N. J.

No Drawing. Application May 27, 1953,
Serial No. 357,904

Claims priority, application Switzerland May 30, 1952

3 Claims. (Cl. 260—251)

The present invention relates to new $$1—(R_2)—3—(R_1)—$$

quinoxalinium salts which can be represented by the formula

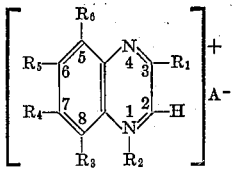

and their corresponding pseudo bases, wherein $R_1$ represents a phenyl radical, $R_2$ a lower alkyl radical, such as methyl or propyl, and each of $R_3$, $R_4$, $R_5$ and $R_6$ represents hydrogen, or a halogen radical, and $A^-$ stands for an anion.

The $R_1$ radical can be unsubstituted or substituted, for example by a lower alkyl group or one or more halogen atoms. The anion $A^-$ is more particularly the acid radical of a strong inorganic or organic acid suitable for the preparation of therapeutically useful and non-toxic salts, for example a hydrohalic acid, such as hydrochloric or hydriodic acid, or sulfuric acid, nitric acid, perchloric acid, a sulfonic acid such as para-toluene sulfonic acid or methane sulfonic acid, or an alkyl sulfuric acid, such as methyl sulfuric acid, furthermore organic carboxylic acids, for example acetic acid, tartaric acid, citric acid, ascorbic acid, benzoic acid, or the hydroxyl ion.

The new compounds possess valuable therapautic properties and can be used as medicaments, more particularly as cardiacs. Compounds comprising the invention exhibit a cardiac activity with systolic contracture.

Especially valuable are the 1-methyl-3-phenyl-quinoxalinium salts, and primarily 1-methyl-3-phenyl-quinoxalinium methyl sulfate of the formula

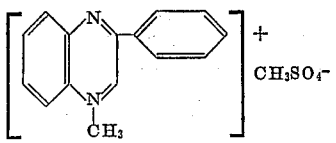

The new compounds are obtained by a process in which a quinoxaline of the formula

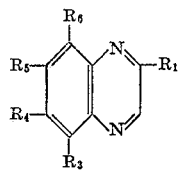

is quaternized with a reactive ester of the formula $$R_2A$$

$R_1$, $R_2$, $R_3$, $R_4$, $R_5$ and $R_6$ having the meanings given above and A representing the acid radical of a strong organic or inorganic acid.

In this manner, for example, 2-phenyl-quinoxalines can be reacted with esters of lower alkanols and hydrohalic acids, organic sulfonic acids and alkylsulfuric acids, as for example methyl iodide, dimethylsulfate or para-toluene sulfuric acid methyl ester.

Depending on the working conditions, either the quinoxalinium salts or their corresponding pseudo bases are formed. The latter can also be prepared from the salts by treatment with alkalies, and can be converted with acids into the corresponding therapeutically useful and non-toxic quinoxalinium salts, advantageously by reaction with strong inorganic or organic acids, for example a hydrohalic acid, such as hydrochloric acid, or sulfuric acid, phosphoric acid, perchloric acid, a sulfonic acid such as toluene sulfonic acid or ethane sulfonic acid, or an alkyl-sulfuric acid, such as methylsulfuric acid, and also with organic carboxylic acids, for example acetic acid, tartaric acid, citric acid, ascorbic acid or benzoic acid.

Depending on the reaction components, the reaction described may be conducted in the presence or absence of a diluent, for example, an alcohol, dioxane, a ketone such as acetone, an ester such as ethyl acetate, a hydrocarbon such as benzene or toluene, or an ether, at ordinary or preferably at a raised temperature in an open vessel or in a closed vessel under pressure. Equimolecular quantities of the reactants or an excess of one reactant may be used.

The compounds used as starting materials are in part known or can be obtained my methods in themselves known.

The following examples illustrate the invention, the parts being by weight unless otherwise stated and the relationship between parts by weight and parts by volume being the same as that of the gram to the cubic centimeter. The temperatures are in degrees centigrade. Percentages are by weight.

Example 1

5 parts of 2-phenylquinoxaline are heated for 3 hours to 100–110° C. with 15 parts by volume of methanol and 10 parts of n-propyl iodide in a fusion tube. On addition of absolute ether to the solution, crystals are obtained which, when recrystallized from a mixture of methanol and ether, melt at 206-208° C. with decomposition, being the 1-n-propyl-3-phenyl-quinoxalinium iodide of the formula

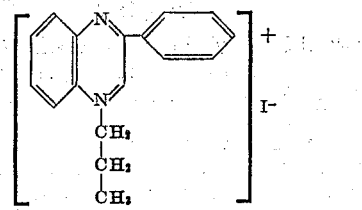

Example 2

1.4 parts of 2-para-xenyl-quinoxaline are heated to 110-115° C. for 6 hours with 0.7 part of dimethyl sulfate and 10 parts by volume of methanol in a sealed tube. Undissolved matter is filtered off in the cold and the filtrate washed with methanol. The methanolic solution is mixed with absolute ether until it begins to become turbid. After cooling with ice the crystals which have formed are separated by suction filtering, washed with ether, and dried at 60° C. The 1-methyl-3-para-xenyl-quinoxalinium-methyl sulfate of the formula

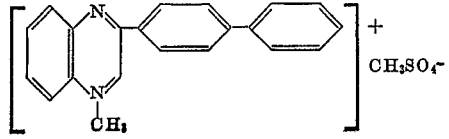

so obtained melts after recrystallization from a mixture of methanol and absolute ether at 212–215° C. (with decomposition).

The 2-para-xenyl-quinoxaline used as starting material can be prepared as follows:

11.5 parts of ω-chloro-aceto-para-xenone and 5.4 parts of ortho-phenylene-diamine are refluxed for 5 hours in 60 parts by volume of 90 per cent. ethanol. The reaction product is allowed to stand for some time and then suction-filtered. The residue is washed with ethanol, dried at 60° C. and recrystallized from cyclohexane. The resulting 2-para-xenyl-quinoxaline melts at 123–124° C.

*Example 3*

5 parts of 2-phenyl-quinoxaline are heated in 20 parts by volume of methanol with 15 parts of methyl iodide for 2 hours in a fusion tube at 100–110° C. The precipitated red crystals are separated by filtering with suction and recrystallized from a mixture of methanol and ethanol. The resulting 1-methyl-3-phenyl-quinoxalinium iodide of the formula

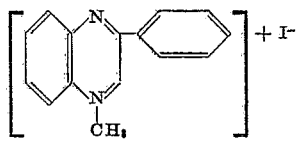

melts at 219–220° C.

*Example 4*

4.1 parts of 2-phenyl-quinoxaline are heated in 20 parts by volume of methanol with 3.8 parts of paratoluene sulfonic acid methyl ester in a fusion tube for 6 hours at 125–130° C. The solution is diluted with a small amount of methanol, and then absolute ether is added so long as the solution remains clear. It is then cooled, allowed to stand for some time and filtered with suction. The crystallizate is recrystallized from 50 parts by volume of ethanol of 96 per cent. strength with the use of animal charcoal and the addition of ethyl acetate and absolute ether. The resulting 1-methyl-3-phenyl-quinoxalinium para-toluene sulfonate of the formula

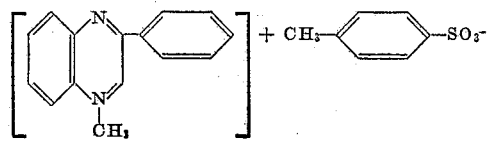

melts at 209–211° C.

*Example 5*

2.4 parts of 2-phenyl-chloro-quinoxaline (melting point, 125–127° C.) are heated with 10 parts by volume of methanol and 2 parts of dimethyl sulfate in a fusion tube at 110–115° C. for 6 hours. After cooling undissolved starting material is removed by filtration and the solution mixed with absolute ether until turbidity appears. The whole is then allowed to stand for crystallization. The resultant crystals melt, after recrystallization from a mixture of methanol and ether, at 189–191° C. with decomposition. They are the 1-methyl-3-phenyl-chloro-quinoxalinium methylsulfate of the formula

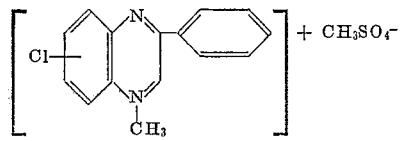

The 2-phenyl-chloro-quinoxaline used as starting material can be prepared as follows:

7.1 parts of 4-chloro-phenylenediamine (1,2) are dissolved in 60 parts by volume of absolute ethanol and the solution mixed with a slight excess of ethyl alcoholic hydrochloric acid. After the addition of 7.5 parts of isonitroso-acetophenone the whole is heated to the boil for 1 hour under reflux and then allowed to cool, when crystallization sets in. After cooling in ice, the product is suction-filtered and recrystallized from ethanol. The resulting 2-phenyl-chloro-quinoxaline melts at 125–127° C.

*Example 6*

4.12 parts of 2-phenylquinoxaline are heated with 1.3 parts of dimethyl sulfate in 20 parts by volume of methanol in a fusion tube at 110–115° C. for 6 hours. The solution is mixed with absolute ether and cooled. After some time the crystals which have formed are separated by suction filtering and recrystallized from a mixture of methanol and ether.

There is thus obtained the 1-methyl-3-phenyl-quinoxalinium methyl sulfate of the formula

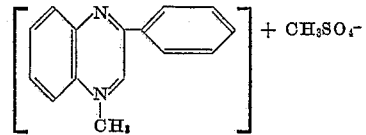

while melts at 156–158° C.

What is claimed is:

1. 1-methyl-3-phenyl-quinoxalinium salts, the anion of which is a therapeutically useful one, and which are unsubstituted in the 2-, 5-, 6-, 7- and 8-position.

2. 1-methyl-3-phenyl-quinoxalinium methyl sulfate.

3. 1-($R_2$)-3-($R_1$)-quinoxalinium salts which are unsubstituted in 2-position and have the nucleus of the formula

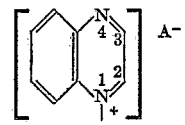

wherein $R_1$ is a phenyl radical, $R_2$ represents a lower alkyl radical and $A^-$ stands for a therapeutically useful anion, and in which the carbocyclic ring of the quinoxaline nucleus is a member selected from the group consisting of an unsubstituted benzene ring and benzene rings substituted solely by chlorine atoms.

No references cited.